(12) United States Patent
Yokota

(10) Patent No.: US 8,777,197 B2
(45) Date of Patent: Jul. 15, 2014

(54) CLAMPING APPARATUS

(75) Inventor: Hideaki Yokota, Hyogo (JP)

(73) Assignee: Kosmek Ltd., Hyogo (JP)

( * ) Notice: Subject to any disclaimer, the term of this patent is extended or adjusted under 35 U.S.C. 154(b) by 0 days.

(21) Appl. No.: 13/522,607

(22) PCT Filed: Jan. 17, 2011

(86) PCT No.: PCT/JP2011/050619
§ 371 (c)(1),
(2), (4) Date: Jul. 17, 2012

(87) PCT Pub. No.: WO2011/089986
PCT Pub. Date: Jul. 28, 2011

(65) Prior Publication Data
US 2012/0292843 A1 Nov. 22, 2012

(30) Foreign Application Priority Data
Jan. 22, 2010 (JP) ................ 2010-028151

(51) Int. Cl.
| B23Q 3/00 | (2006.01) |
| B25B 1/00 | (2006.01) |
| B23Q 3/08 | (2006.01) |
| F01B 3/00 | (2006.01) |
| B23Q 3/06 | (2006.01) |

(52) U.S. Cl.
USPC .............. 269/20; 269/24; 269/29; 92/33

(58) Field of Classification Search
USPC .............. 269/20, 24, 29, 32; 92/33
See application file for complete search history.

(56) References Cited

U.S. PATENT DOCUMENTS

| 6,663,093 B2 * | 12/2003 | Yonezawa et al. ........ 269/24 |
| 6,666,440 B2 * | 12/2003 | Yonezawa et al. ........ 269/29 |
| 6,736,384 B2 * | 5/2004 | Yokota ................ 269/32 |
| 6,902,158 B2 * | 6/2005 | Yonezawa et al. ........ 269/24 |
| JP 63120048 | | 5/1988 |

(Continued)

FOREIGN PATENT DOCUMENTS

| JP | 60018267 U | 2/1985 |
| JP | 60123238 A | 7/1985 |

(Continued)

OTHER PUBLICATIONS

Japanese International Preliminary Report on Patentability issued in PCT/JP2011/050619, dated Jan. 22, 2012, and English translation thereof.
International Search Report for PCT/JP2011/050619, Feb. 8, 2011.

*Primary Examiner* — Lee D Wilson
*Assistant Examiner* — Alvin Grant
(74) *Attorney, Agent, or Firm* — Bacon & Thomas, PLLC

(57) ABSTRACT

An annular piston is vertically movable and rotatable. A guide groove is provided in an outer peripheral portion of the annular piston, and an engaging ball to be fitted into the guide groove is provided on an inner peripheral wall of a cylinder hole. A transmission mechanism prevents the clamp rod and the annular piston from rotating relatively to each other and permits them to move relatively to each other in a vertical direction. When the clamp rod is moved from a released raised position to a locked lowered position, the annular piston descends while rotating via a rotational groove and the engaging ball, and the annular piston causes the clamp rod to rotate, causing the clamp rod to descend straight down.

6 Claims, 4 Drawing Sheets

(56) References Cited

U.S. PATENT DOCUMENTS

| | | |
|---|---|---|
| 6,902,159 B2 * | 6/2005 | Sawdon et al. ............ 269/32 |
| 6,908,077 B2 * | 6/2005 | Sawdon ..................... 269/32 |
| 6,929,254 B2 * | 8/2005 | Steele et al. ............... 269/24 |
| 2003/0090046 A1 * | 5/2003 | Yonezawa et al. ......... 269/24 |
| 2009/0152784 A1 * | 6/2009 | Yonezawa et al. ......... 269/32 |

FOREIGN PATENT DOCUMENTS

| | | |
|---|---|---|
| JP | 2001-113428 A | 4/2001 |
| JP | 2001-113428 A | 4/2011 |

* cited by examiner

CLAMPING APPARATUS

TECHNICAL FIELD

This invention relates to a clamping apparatus configured so that a clamp rod is horizontally rotated in a released raised position and then is driven straight down to a locked lowered position.

BACKGROUND ART

As such a horizontal swing clamping apparatus, conventionally, there is an apparatus described in patent literature 1 (Japanese Examined Utility Model Publication No. 18267/1985 (Jitsukoushou 60-18267)). This conventional art is structured as follows.

An annular free piston is inserted between a cylinder hole of a cylinder tube and a piston rod. An inner end portion of a free piston rotation prevention pin is fitted into a straight advance guiding groove provided in a peripheral wall of the free piston, and an outer end portion of the rotation prevention pin is fixed to the cylinder tube. Further, a rotation guiding groove is formed in the peripheral wall of the free piston so as to be opposed to the straight advance guiding groove across the piston rod. An outer end portion of a rotation pin is fitted into the rotation guiding groove, and an inner end portion of the rotation pin is fixed to the piston rod. Furthermore, a piston descent restriction pin is fixed to a lower end of the piston rod. The piston descent restriction pin is configured so as to be able to face a clamping stroke guiding groove of a head cover fixed to a lower portion of the cylinder tube.

In the above-described conventional art, the piston rod (and a clamper) is (are) switched from a released raised position to a locked lowered position according to the following procedure.

First, in a state where both ends of the piston descent restriction pin fixed to a lower portion of the piston rod are received by an upper portion of the head cover, the free piston descends straight down along the straight advance guiding groove. With this, the rotation guiding groove provided in the free piston causes, via the rotation pin, the piston rod (and the clamper) to horizontally rotate in the released raised position. Then, when the both ends of the piston descent restriction pin face the clamping stroke guiding groove and thereby their phases match each other, the piston rod (and the clamper) is (are) driven straight down to the locked lowered position along the clamping stroke guiding groove.

CITATION LIST

Patent Literature

Patent Literature 1: Japanese Examined Utility Model Publication No. 18267/1985 (Jitsukoushou 60-18267) (FIG. 2a to FIG. 2e, and descriptions in the Specification corresponding to these figures)

SUMMARY OF INVENTION

Technical Problem

The above-described conventional art has the following problem.

When the piston rod (and the clamper) rotate(s), due to a downward force exerted by the free piston onto the piston rod, the both ends of the piston descent restriction pin are always received by the upper portion of the head cover. Therefore, a large frictional resistance is offered by the upper portion of the head cover to the both ends to the piston descent restriction pin, resulting in large resistance in rotation of the piston rod.

Further, at the last stage of the rotation of the piston rod, immediately before the phase of the both ends of the piston descent restriction pin matches the phase of the clamping stroke guiding groove, the both ends of the piston descent restriction pin approach an edge portion of the clamping stroke guiding groove while rotating, and therefore the bearing area of the edge portion is gradually decreased. This increases a surface pressure of the edge portion of the clamping stroke guiding groove to an extremely high level, and thereby the edge portion is possibly broken due to plastic deformation. As a result, there is a possibility that the piston descent restriction pin is fitted into the clamping stroke guiding groove before their phases match each other, and a locking drive is conducted before the piston rod (and the clamper) has (have) rotated a predetermined angle of rotation.

An object of the present invention is to provide a clamping apparatus capable of horizontally rotating a predetermined angle of rotation smoothly.

Solution to Problem

In order to achieve the above object, for example as shown in FIG. 1 to FIG. 5, the present invention structures a clamping apparatus as follows.

Specifically, the apparatus is configured so that a clamp rod 7 inserted into a cylinder hole 6 of a housing 2 is rotated in a released raised position and then is driven straight down to a locked lowered position.

An annular piston 13 is hermetically inserted between the cylinder hole 6 and the clamp rod 7 so as to be movable in an axial direction and to be rotatable about an axis. A guide groove 18 having a rotational groove 23 and a straight advance groove 24 which are provided so as to be contiguous with each other upwardly is provided in either one of (i) an outer peripheral portion of the annular piston 13 and (ii) an inner peripheral wall of the cylinder hole 6. An engaging member 19 which is fitted into the guide groove 18 is provided on the other of (i) the outer peripheral portion of the annular piston 13 and (ii) the inner peripheral wall of the cylinder hole 6. A transmission mechanism 26 which prevents the clamp rod 7 and the annular piston 13 from rotating relatively to each other about the axis and permits the clamp rod 7 and the annular piston 13 to move relatively to each other in the axial direction is provided between the clamp rod 7 and the annular piston 13. A lock actuation chamber 40 which pressurized fluid is supplied to and discharged from is formed above the annular piston 13. A diameter D1 of a portion of the clamp rod 7 that is sealed in an upper end wall 3a of the housing 2 is designed to be larger than a diameter D2 of a portion of the clamp rod 7 that is sealed in the annular piston 13. The apparatus is configured so that when the clamp rod 7 is moved from the released raised position to the locked lowered position, pressurized fluid is supplied to the lock actuation chamber 40, and thereby the annular piston 13 descends while rotating via the rotational groove 23 and the engaging member 19 with the clamp rod 7 being kept lifted in the released raised position by a force differential between upward and downward forces exerted on the clamp rod 7 by the pressurized fluid in the lock actuation chamber 40, and thereby the annular piston 13 causes, via the transmission mechanism 26, the clamp rod 7 to rotate in the released raised position, and thereafter, the annular piston 13 causes, via a driven portion 33 provided to the clamp rod 7, the clamp rod 7 to descend straight down. Further, an erroneous operation prevention mechanism M which prevents the clamp rod 7 from descending during its rotation and permits the clamp rod 7 to descend during its straight descent is provided to a lower portion of the clamp rod 7 and in a lower end wall 5 of the housing 2.

The present invention provides following functions and effects, for example.

When the clamp rod (and a clamp arm) is (are) rotated in the released raised position, the annular piston which is rotated via the rotational groove and the engaging member causes the clamp rod to rotate, and therefore a downward force is hardly exerted onto the clamp rod. Accordingly, in the present invention, there is no longer need to receive the lower portion of the clamp rod by the lower end wall of the housing, differently from the above-described conventional art. As a result, a large frictional resistance is not offered by the lower end wall of the housing to the lower portion of the clamp rod, and resistance in rotation of the clamp rod is smaller, so that the clamp rod rotates smoothly.

In addition, since the lock actuation chamber is provided above the annular piston, and the diameter of the portion of the clamp rod that is sealed in the upper end wall of the housing is designed to be larger than the diameter of the portion of the clamp rod that is sealed in the annular piston, the clamp rod is able to be lifted in the released raised position by the force differential between upward and downward forces exerted on the clamp rod by the pressurized fluid in the lock actuation chamber. This ensures that the clamp rod is held in the released raised position by the force differential between upward and downward forces, and therefore positional accuracy on a height at which the clamp rod is horizontally rotated is improved.

Moreover, in the present invention, the clamp rod is held in the released raised position by pressurized fluid in the lock actuation chamber, and therefore, unlike the above-described conventional art, there is no longer need to always receive the piston descent restriction pin by the upper portion of the head cover, and this eliminates detriment such that the edge portion of the clamping stroke guiding groove provided in the head cover is broken due to plastic deformation. Therefore, the clamp rod (and the clamp arm) reliably rotate(s) a predetermined angle of rotation, and then is (are) lowered and locked. As a result, a failure in clamping an object to be fixed such as a workpiece is reliably prevented.

Further, according to the present invention, the annular piston rotates about the axis and thereby causing the clamp rod to rotate. Therefore, unlike the above-described conventional art in which straight-advance movement of the free piston is converted to the rotation of the piston rod, even if components of the clamping apparatus are aged due to long-term use, the rotation of the clamp rod (and the clamp arm) is ensured. As a result, rotational operation and locking operation of the clamping apparatus can be definitely distinguished.

Further, if, at the beginning of switching from the released raised position to the locked lowered position, the annular piston is unintentionally integral with the clamp rod for some reason, for example, such as a case where foreign matter is caught in a portion where an inner peripheral surface of the annular piston is fitted to an outer peripheral surface of the clamp rod, there is a possibility that the clamp rod also descends while rotating along with the rotational descent of the annular piston. In this case, the clamp arm fixed to an upper portion of the clamp rod also descends while rotating, which causes detriment such that the clamp arm interferes with other objects. However, according to the present invention, the lower portion of the clamp rod and the lower end wall of the housing, which constitute the erroneous operation prevention mechanism, cooperate with each other during the rotation of the clamp rod, and thereby the lower end wall of the housing prevents the lower portion of the clamp rod from descending over a predetermined amount, so that the above-described detriment is prevented.

In the present invention, it is preferable that the guide groove 18 is provided in the outer peripheral portion of the annular piston 13 and the engaging member 19 is provided on the inner peripheral wall of the cylinder hole 6.

In this case, the guide groove is machined easily and precisely, and therefore a high-performance clamping apparatus is manufactured at a low cost.

Further, in the present invention, it is preferable that the erroneous operation prevention mechanism M includes: a fitting hole 52 provided in the lower end wall 5 of the housing 2; and a fitting portion 54 provided to the lower portion of the clamp rod 7, the fitting portion 54 being configured so that its descent is prevented by a peripheral wall 52a of the fitting hole 52 during the rotation in the released raised position and the fitting portion 54 is fitted into the fitting hole 52 at a time of the straight descent. This realizes a simple structure of the erroneous operation prevention mechanism.

The fitting hole 52 and the fitting portion 54 may be formed into an oval shape in a plan view, and this realizes a simpler structure of the erroneous operation prevention mechanism.

Further, in the present invention, it is preferable that a predetermined gap G is formed between a top surface of the peripheral wall 52a of the fitting hole 52 and an under surface of the fitting portion 54 when the clamp rod 7 is kept lifted in the released raised position. In this case, the top surface of the peripheral wall and the under surface of the fitting portion do not slide on each other during the rotation of the clamp rod, and this increases the life-span of the erroneous operation prevention mechanism.

BRIEF DESCRIPTION OF DRAWINGS

FIG. 1A is an elevational sectional view of a clamping apparatus in a released state. FIG. 1B is a view corresponding to a section taken along a line B-B of FIG. 1A.

REFERENCE SIGNS LIST

Figure 1A:
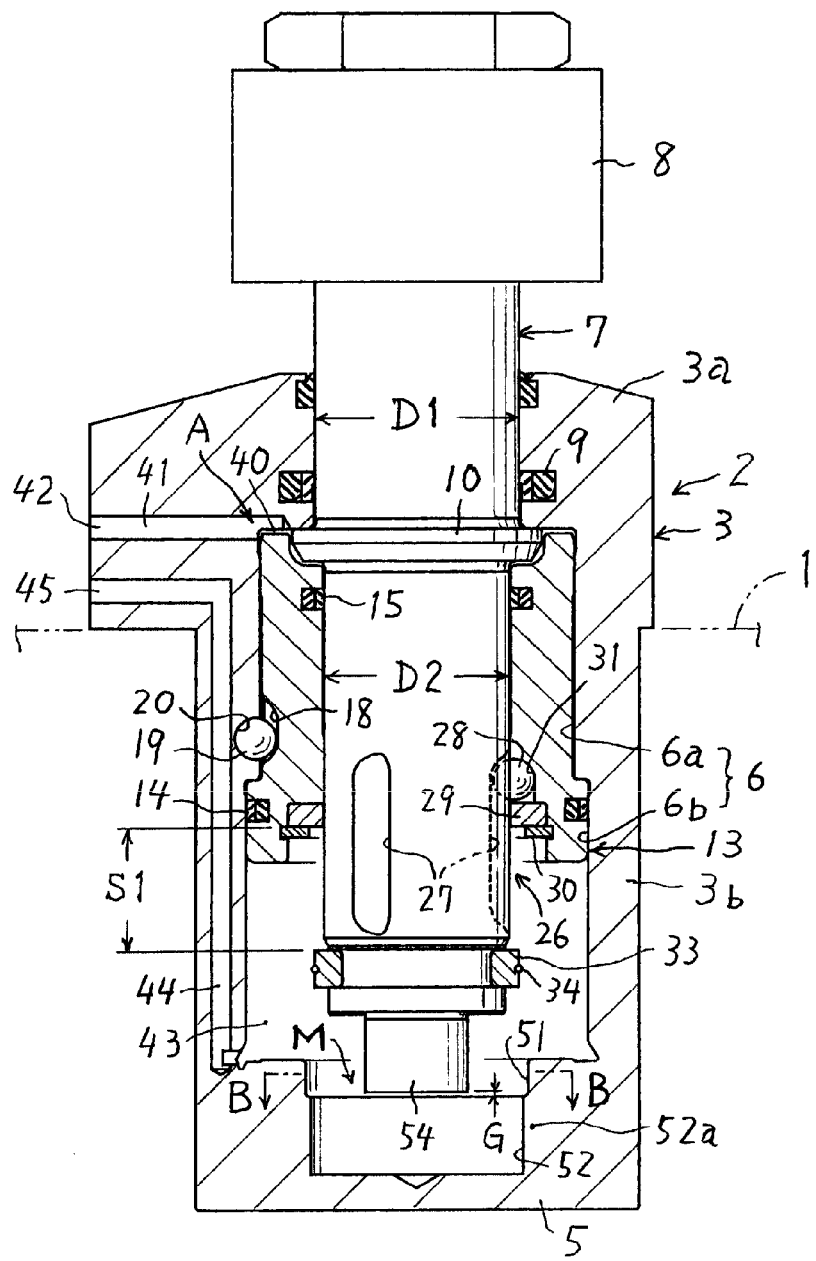
FIG. 1A and FIG. 1B show one embodiment of the present invention.

2: housing, 3a: upper end wall of housing body 3 of housing 2, 5: lower end wall of housing body 3, 6: cylinder hole, 7: clamp rod, 13: annular piston, 18: guide groove, 19: engaging member (engaging ball), 23: rotational groove, 24: straight advance groove, 26: transmission mechanism, 33: driven portion, 40: lock actuation chamber, 52: fitting hole, 52a: peripheral wall, 54: fitting portion, D1 and D2: diameters of clamp rod 7, G: gap, M: erroneous operation prevention mechanism

DESCRIPTION OF EMBODIMENTS

Hereinafter, one embodiment of the present invention will be described with reference to FIG. 1 to FIG. 5. First, referring to FIG. 1A to FIG. 3, a structure of a clamping apparatus of the present invention will be described.

A housing 2 includes: a housing body 3 which is fixed to a base 1 through a plurality of bolts (not shown); and a lower end wall 5 provided to a lower portion of the housing body 3.

A clamp rod 7 is inserted into a cylinder hole 6 of the housing 2. A clamp arm 8 is removably fixed to an upper end portion of the clamp rod 7. Further, a middle-upper portion of the clamp rod 7 is hermetically and tightly fitted into an upper end wall 3a of the housing body 3 via a sealing member 9. Furthermore, a flange 10 provided at a midway portion of the clamp rod 7 is rotatably receivable at an under surface of the upper end wall 3a.

The cylinder hole 6 includes: a smaller diameter hole 6a of its upper half portion; and a larger diameter hole 6b of its lower half portion. An annular piston 13 is hermetically inserted into an annular space between the cylinder hole 6 and the clamp rod 7, via an outer sealing member 14 and an inner sealing member 15, so as to be movable in an axial direction (a vertical direction in this embodiment) and to be rotatable about an axis.

In an outer peripheral portion of the annular piston 13, three guide grooves 18 are formed at substantially equal intervals in a circumferential direction. Further, engaging balls (engaging member) 19 which are fitted into the respective guide grooves 18 are provided on an inner peripheral wall of the smaller diameter hole 6a of the cylinder hole 6. Each engaging ball 19 is held in a recessed hole 20 formed in the inner peripheral wall of the smaller diameter hole 6a.

Figure 3:
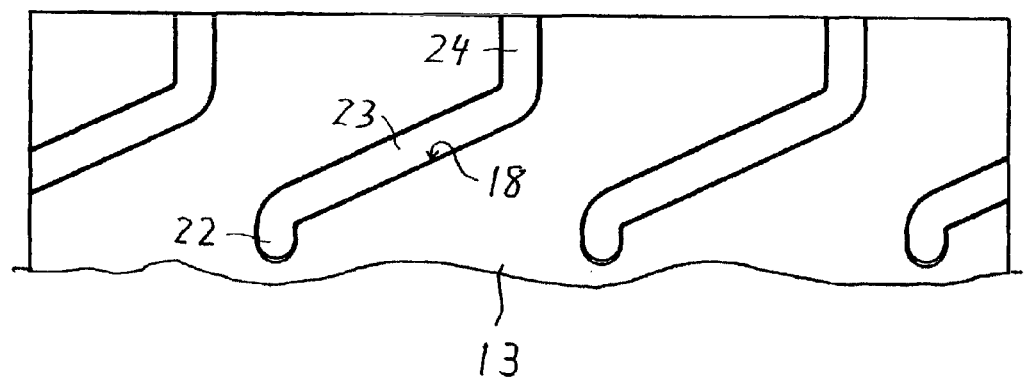
FIG. 3 is a developed view of an outer peripheral portion of an annular piston provided to the clamping apparatus.

As mainly shown in a developed view of FIG. 3, each of the guide grooves 18 is formed of a lower groove 22, a rotational groove 23, and a straight advance groove 24, which are contiguous with one another upwardly. It is preferable that an inclination angle of the rotational groove 23 is within a range from 10 to 30 degrees, and it is designed to be approximately 20 degrees in this embodiment.

A transmission mechanism 26 is provided between the clamp rod 7 and the annular piston 13. The transmission mechanism 26 is arranged to prevent the clamp rod 7 and the annular piston 13 from rotating relatively to each other about the axis and to permit them to move relatively to each other in the axial direction, and is structured as follows in this embodiment.

In an outer peripheral portion of a middle-lower portion of the clamp rod 7, three transmission grooves 27 each extending in the vertical direction are formed at substantially equal intervals in the circumferential direction. Transmission balls 28 to be fitted into the respective transmission grooves 27 are provided to the annular piston 13. Each of the transmission balls 28 is held in a recess 31 of the annular piston 13 via a supporting plate 29 and a retaining ring 30.

Further, a driven portion 33 divided into left and right parts is fittingly attached to the middle-lower portion of the clamp rod 7, through a retaining ring 34.

A lock actuation chamber 40 is formed between the upper end wall 3a of the housing body 3 and the annular piston 13, and a lock port 42 is communicatively connected to the lock actuation chamber 40 via a pressurized oil supply/discharge passage 41. Further, a release actuation chamber 43 is formed between the lower end wall 5 and the annular piston 13, and a release port 45 is communicatively connected to the release actuation chamber 43 via another pressurized oil supply/discharge passage 44.

The clamp rod 7 is designed in such a manner that a diameter D1 of a portion thereof that is sealed in the upper end wall 3a through the sealing member 9 is larger than a diameter D2 of a portion thereof that is sealed in the annular piston 13 through the inner sealing member 15. With this, a pressure-receiving sectional area of the middle-upper portion of the clamp rod 7 is larger than a pressure-receiving sectional area of the middle-lower portion, and the clamp rod 7 is lifted to a released raised position shown in FIG. 1A by a differential force, which is a differential between forces exerted thereon by pressurized oil in the lock actuation chamber 40.

Specifically, in this embodiment, there is constructed a mechanism in which the clamp rod 7 is held in the released raised position toward its upper end by the upward differential force acting on the clamp rod 7.

An annular pressure-receiving sectional area of the annular piston 13 is designed so that a downward force acting thereon is larger than the upward differential force acting on the clamp rod 7.

The lock actuation chamber 40, the release actuation chamber 43, and the annular piston 13 constitute a drive mechanism A which raises/lowers the annular piston 13.

Further, there is provided an erroneous operation prevention mechanism M which prevents the clamp rod 7 from descending during its rotation in the released raised position and permits the clamp rod 7 to descend during its straight descent, which will be described later. The erroneous operation prevention mechanism M is structured as follows.

In the lower end wall 5 of the housing 2, an accommodation hole 51 having a circular shape in a plan view; and a fitting hole 52 formed into an oval shape are provided vertically. A fitting portion 54 formed into an oval shape in a plan view so as to correspond to the fitting hole 52 is provided to the lower end portion of the clamp rod 7. In the released state of FIG. 1A, a longitudinal axis of the fitting portion 54 is orthogonal to a longitudinal axis of the fitting hole 52 (see FIG. 1B). Further, in the released state of FIG. 1A, a small gap G is formed between an under surface of the fitting portion 54 and a top surface of a peripheral wall 52a of the fitting hole 52.

Figure 1B:
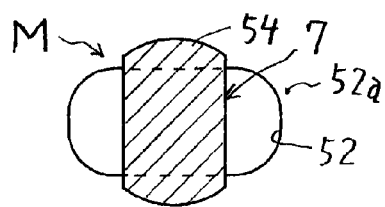
Figure 2:
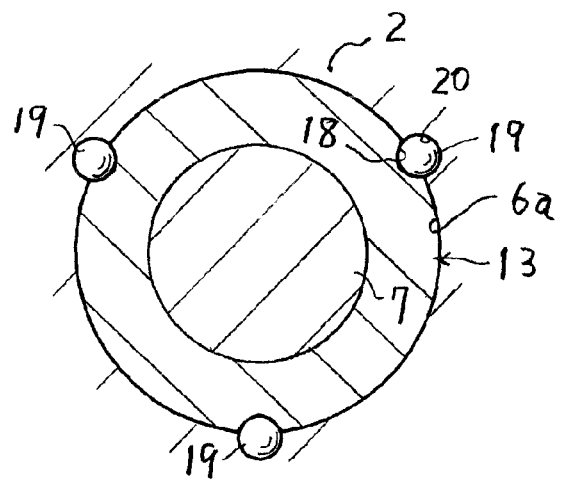
FIG. 2 is a transverse sectional view of an essential portion of the clamping apparatus.

If the clamp rod 7 descends, for some reason, during its rotation in the released raised position, the under surface of the fitting portion 54 is received by the peripheral wall 52a of the fitting hole 52, and thereby the descent of the clamp rod 7 is blocked (see FIG. 1B). On the other hand, at the time of the straight descent (described later) of the clamp rod 7, the fitting portion 54 is adapted to be fitted into the fitting hole 52 (see FIG. 5A and FIG. 5B which will be described later).

The clamping apparatus having the above-described structure operates as follows.

In the released state of FIG. 1, pressurized oil in the lock actuation chamber 40 has been discharged and pressurized oil has been supplied to the release actuation chamber 43. With this, the annular piston 13 has been raised. Further, the clamp rod 7 is held in the released raised position of FIG. 1A by an upward force acting on the pressure-receiving sectional area corresponding to the diameter D2.

Figure 5A:
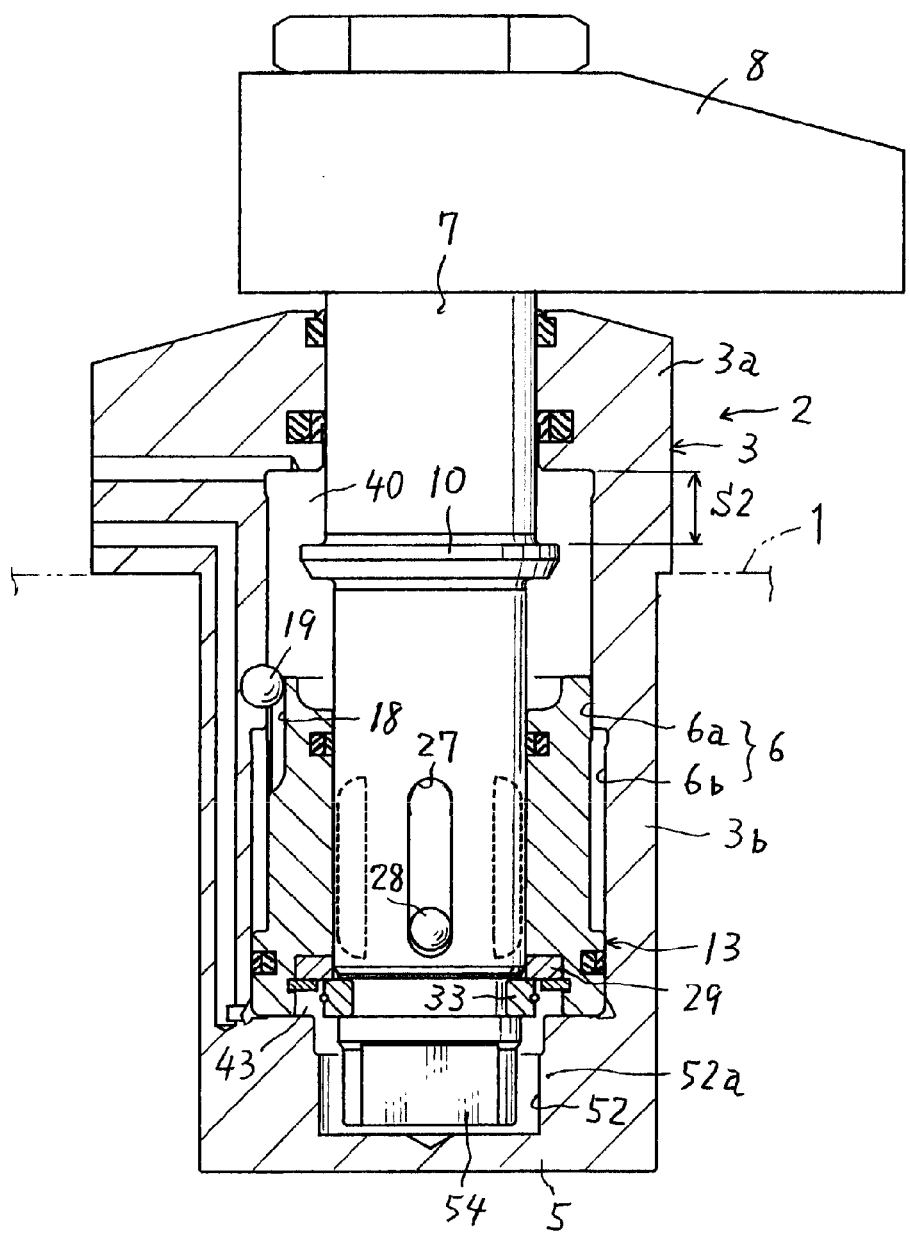
FIG. 5A and FIG. 5B show the clamping apparatus in a locked state, and are views similar to FIG. 1A and FIG. 1B, respectively.
Figure 5B:
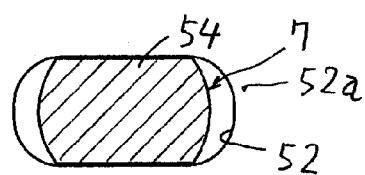

When the released state of FIG. 1A is switched to a locked state of FIG. 5A, in the released state of FIG. 1A, pressurized oil in the release actuation chamber 43 is discharged and pressurized oil is supplied to the lock actuation chamber 40.

Figure 4A:
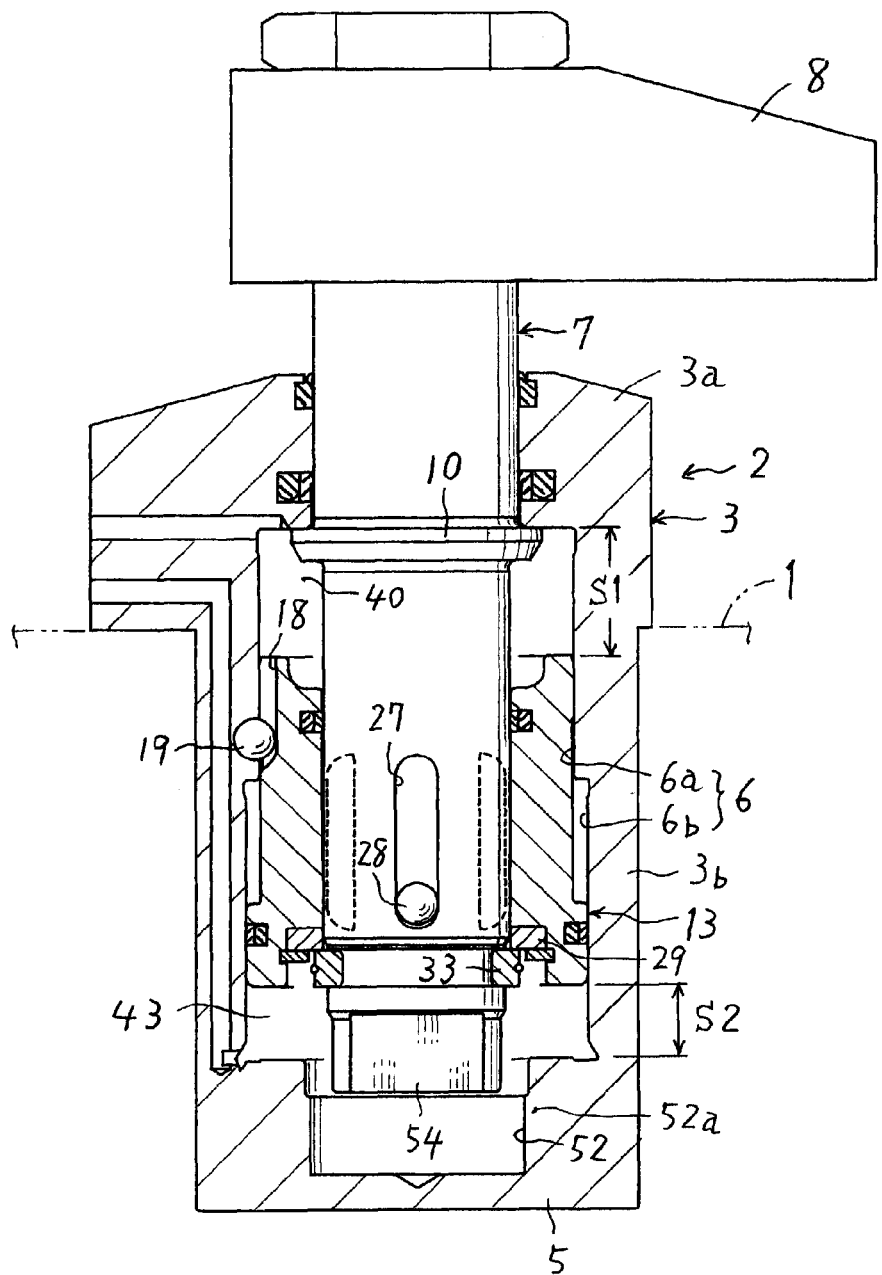
FIG. 4A and FIG. 4B show the clamping apparatus in the middle of switching and are views similar to FIG. 1A and FIG. 1B, respectively.
Figure 4B:
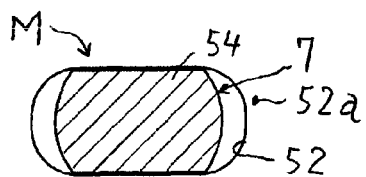

Then, as shown in FIG. 4A, due to a pressure in the lock actuation chamber 40, the annular piston 13 descends along the rotational grooves 23 while rotating in a clockwise direction in a plan view. With this, the clamp rod 7 (and the clamp arm 8) held in the released raised position is (are) horizontally rotated in the clockwise direction in a plan view, via the transmission balls 28 and the transmission grooves 27.

When the annular piston 13 descends for a rotational stroke S1, the clamp rod 7 (and the clamp arm 8) rotate(s) substantially 90 degrees and the supporting plate 29 fixed to a lower portion of the annular piston 13 comes into contact with the driven portion 33. At the same time, the phase of the fitting portion 54 provided to the lower end of the clamp rod 7 matches the phase of the fitting hole 52 (see FIG. 4B), and the fitting portion 54 faces the fitting hole 52.

Subsequently, as shown in FIG. 5A, due to a pressure in the lock actuation chamber 40, the annular piston 13 descends straight down along the straight advance grooves 24, and the annular piston 13 causes, via the driven portion 33, the clamp rod 7 to descend straight down. Then, when the clamp rod 7 descends for a locking stroke S2, an under surface of the annular piston 13 is received by a top surface of the lower end wall 5.

Note that, the above description has been given on the state where the clamp rod 7 and the clamp arm 8 are moved downward through full stroke; however, the clamp arm 8 is configured to fix a workpiece (not shown) before it is moved downward through full stroke.

When the locked state of FIG. 5A is switched to the released state of FIG. 1A, in the locked state of FIG. 5A, pressurized oil in the lock actuation chamber 40 is discharged and pressurized oil is supplied to the release actuation chamber 43. With this, the clamping apparatus operates through the reversed procedure of the above-described procedure.

Specifically, first, as shown in FIG. 4A, the annular piston 13 and the clamp rod 7 are raised straight up by a hydraulic force of the release actuation chamber 43, and the flange 10 of the clamp rod 7 is received by the upper end wall 3a. Then, as shown in FIG. 1A, the annular piston 13 which ascends while rotating causes the clamp rod 7 to rotate in a counterclockwise direction in a plan view.

Meanwhile, if, at the beginning of the switching from the state of FIG. 1A to the state of FIG. 4A, foreign matter is caught in a portion where an inner peripheral surface of the annular piston 13 is fitted to an outer peripheral surface of the clamp rod 7, there is a possibility that the annular piston 13 is unintentionally integral with the clamp rod 7, and the clamp rod 7 also descends while rotating along with the rotational descent of the annular piston 13. In this case, the clamp arm 8 fixed to an upper portion of the clamp rod 7 also descends while rotating, and this causes detriment that the clamp arm 8 interferes with other objects.

However, according to the present invention, rotational descent of the clamp rod 7 over a predetermined amount is prevented by a structure that the fitting portion 54 is received by the peripheral wall 52a of the fitting hole 52 (see FIG. 1B), and therefore the above detriment is prevented.

The above-described embodiment is changeable as follows.

The angle of rotation of the clamp rod 7 is exemplarily described as approximately 90 degrees in the above embodiment; however, a desired angle of rotation may be set by changing a length in an inclination direction of the rotational groove 23 of each guide groove 18.

The direction of rotation of the clamp rod 7 (and the clamp arm 8) may be changed to a direction opposite to the direction of rotation exemplarily described above, by reversing the inclination direction of each guide groove 18.

In order to substantially evenly support the clamp rod 7 (and the clamp arm 8) in the circumferential direction, it is preferable that the number of the guide grooves 18 and the engaging balls (engaging member) 19 is three or four; however, the number may be one or two, or five or more. In the same way, it is preferable that the number of the transmission grooves 27 and the transmission balls 28 of the transmission mechanism 26 is three or four; however, the number may be one or two, or five or more.

The transmission member of the transmission mechanism 26 may be a key, instead of the balls 28 exemplarily described. Further, each transmission groove 27 of the transmission mechanism 26 may be formed into a spline.

Each guide groove 18 may be provided in an inner peripheral wall of the cylinder hole 6, instead of the outer peripheral portion of the annular piston 13. In this case, it is preferable that a sleeve (not shown) having the guide groove 18 formed in its inner peripheral portion is fitted into and fixed to a cylindrical hole of the housing body 3, and the inner periphery of the sleeve constitutes the smaller diameter hole 6a of the cylinder hole 6.

In the above case, each engaging ball (engaging member) 19 is provided on the outer peripheral portion of the annular piston 13, instead of the inner peripheral wall of the cylinder hole 6.

Instead of providing the gap G between the top surface of the peripheral wall 52a of the fitting hole 52 and the under surface of the fitting portion 54, the fitting portion 54 may be lightly brought into contact with the top surface of the peripheral wall 52a.

For the fitting structure between the fitting hole 52 and the fitting portion 54, various modifications are possible instead of the structure exemplarily described, and for example, it may be a structure shown in FIG. 2a and FIG. 2c of the above-described conventional art (Japanese Examined Utility Model Publication No. 18267/1985 (Jitsukoushou 60-18267)).

The drive mechanism A which drives the annular piston 13 may have a following structure, instead of the structure in which the actuation chambers 40 and 43 are formed above and below the annular piston 13 respectively. Specifically, the lock actuation chamber 40 is formed above the annular piston 13 and a spring chamber is formed below the annular piston 13, and a return spring attached in this spring chamber is used to urge the annular piston 13 upwardly.

Working fluid of the clamping apparatus may be gas such as compressed air, instead of liquid such as pressurized oil.

Furthermore, it is a matter of course that various other changes or alterations can be made within the scope of envisagement of one skilled in the art.

The invention claimed is:

1. A clamping apparatus comprising a clamp rod (7) inserted into a cylinder hole (6) of a housing (2) is rotated in a released raised position and then is driven straight down to a locked lowered position, the clamping apparatus further comprising:

an annular piston (13) which is hermetically inserted between the cylinder hole (6) and the clamp rod (7) so as to be movable in an axial direction and to be rotatable about an axis;

a guide groove (18) which is provided in either one of (i) an outer peripheral portion of the annular piston (13) and (ii) an inner peripheral wall of the cylinder hole (6), the guide groove (18) having a rotational groove (23) and a straight advance groove (24) which are provided so as to be contiguous with each other upwardly;

an engaging member (19) which is provided on the other of (i) the outer peripheral portion of the annular piston (13) and (ii) the inner peripheral wall of the cylinder hole (6), and is fitted into the guide groove (18);

a transmission mechanism (26) which is provided between the clamp rod (7) and the annular piston (13), and prevents the clamp rod (7) and the annular piston (13) from rotating relatively to each other about the axis and permits the clamp rod (7) and the annular piston (13) to move relatively to each other in the axial direction; and a lock actuation chamber (40) which is formed above the annular piston (13) and pressurized fluid is supplied to and discharged from;

wherein a diameter (D1) of a portion of the clamp rod (7) that is sealed in an upper end wall (3a) of the housing (2) is designed to be larger than a diameter (D2) of a portion of the clamp rod (7) that is sealed in the annular piston (13);

wherein, the apparatus is configured so that when the clamp rod (7) is moved from the released raised position to the locked lowered position, pressurized fluid is supplied to the lock actuation chamber (40), and thereby the annular piston (13) descends while rotating via the rotational groove (23) and the engaging member (19) with the clamp rod (7) being kept lifted in the released raised position by a force differential between upward and downward forces exerted on the clamp rod (7) by the pressurized fluid in the lock actuation chamber (40), and thereby the annular piston (13) causes, via the transmission mechanism (26), the clamp rod (7) to rotate in the released raised position, and thereafter, the annular piston (13) causes the clamp rod (7) to descend straight down via a driven portion fittingly attached to the clamp rod; and wherein an erroneous operation prevention mechanism (M) which prevents the clamp rod (7) from descending during its rotation and permits the clamp rod (7) to descend during its straight descent is provided to a lower portion of the clamp rod (7) and in a lower end wall (5) of the housing (2), and wherein said erroneous operation prevention mechanism has a dissimilar shape from said lower end wall of the housing.

2. The clamping apparatus according to claim 1, wherein the guide groove (18) is provided in the outer peripheral portion of the annular piston (13), and the engaging member (19) is provided on the inner peripheral wall of the cylinder hole (6).

3. The clamping apparatus according to claim 1 or 2, wherein the erroneous operation prevention mechanism (M) comprises: a fitting hole (52) provided in the lower end wall (5) of the housing (2); and a fitting portion (54) provided to the lower portion of the clamp rod (7), the fitting portion (54) being configured so that its descent is prevented by a peripheral wall (52a) of the fitting hole (52) during the rotation in the released raised position and the fitting portion (54) is fitted into the fitting hole (52) at a time of the straight descent.

4. The clamping apparatus according to claim 3, wherein the fitting hole (52) and the fitting portion (54) are formed into an oval shape in a plan view.

5. The clamping apparatus according to claim 3, wherein a predetermined gap (G) is formed between a top surface of the peripheral wall (52a) of the fitting hole (52) and an under surface of the fitting portion (54) when the clamp rod (7) is kept lifted in the released raised position.

6. The clamping apparatus according to claim 4, wherein a predetermined gap (G) is formed between a top surface of the peripheral wall (52a) of the fitting hole (52) and an under surface of the fitting portion (54) when the clamp rod (7) is kept lifted in the released raised position.

* * * * *